Feb. 9, 1932. J. J. HENRY 1,844,220
SPRING TRAP
Filed July 30, 1930
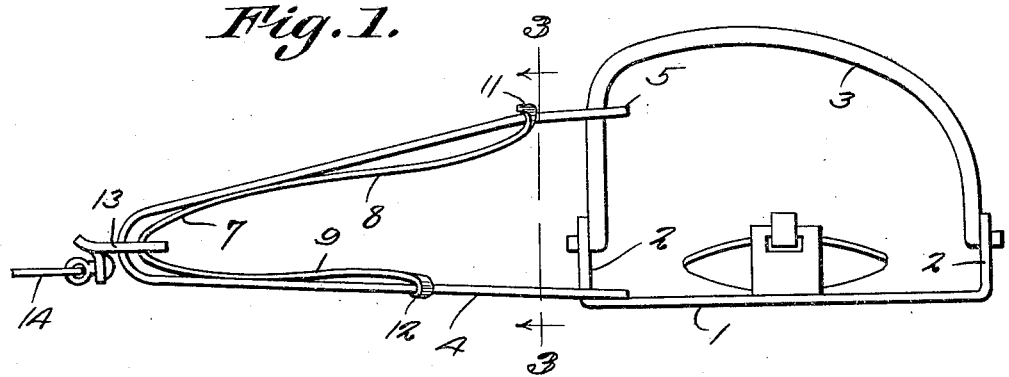
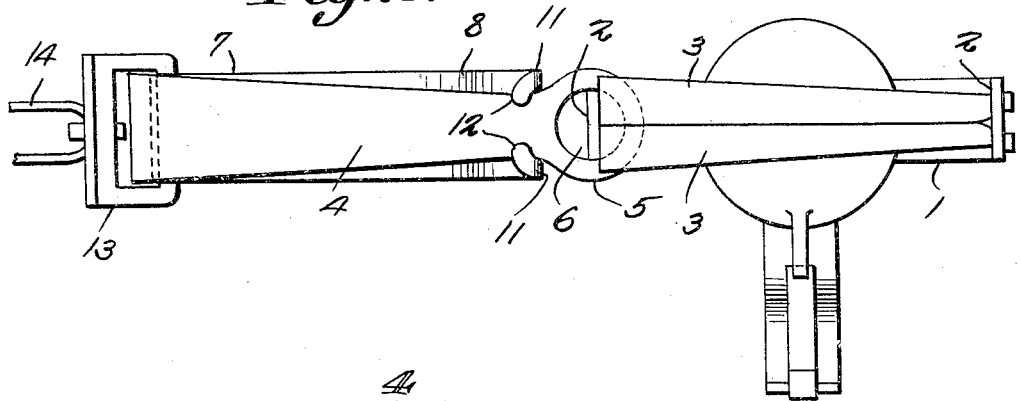
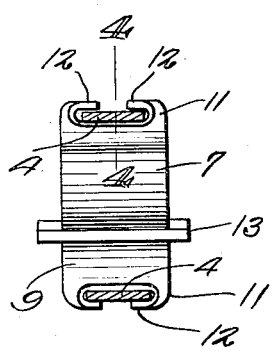
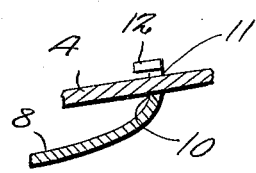
Inventor
John J. Henry
By CASnow &Co.
Attorneys.

Patented Feb. 9, 1932

1,844,220

UNITED STATES PATENT OFFICE

JOHN J. HENRY, OF MASON, ILLINOIS

SPRING TRAP

Application filed July 30, 1930. Serial No. 471,793.

This invention relates to a spring trap of that type utilizing pivoted jaws adapted to be actuated by a spring.

It is an object of the invention to provide the trap with a supplemental spring which serves to reinforce the spring commonly employed, the two springs being so connected as to have relative movement so that the setting of the trap will not be rendered too difficult.

Another object is to provide a supplemental spring which will be shifted relative to the main spring when the trapped animal pulls upon the trap so that the holding action of the main spring will be increased and the animal will be prevented from escaping.

Another object is to provide a supplemental spring which acts to grip the main spring under normal conditions to resist compression thereof.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings, the preferred form of the invention has been shown.

In said drawings:

Figure 1 is a side elevation of the trap provided with the attachment constituting the present invention.

Figure 2 is a plan view thereof.

Figure 3 is a section on line 3—3, Figure 1.

Figure 4 is an enlarged section through a portion of the trap on the line 4—4, Figure 3.

Referring to the figures by characters of reference, 1 designates the base of a trap having spaced ears 2 between which is pivotally mounted a pair of jaws 3 of the usual construction. A spring 4 is fastened to the base and folded so that one free end portion 5 in which is formed an opening 6, can slide along the jaws at one end to close them and hold them closed as shown in Figures 1 and 2.

The attachment constituting the present invention consists of a trap spring 7 folded to provide an upper arm 8 and a lower shorter arm 9. Each of these arms defines a compound curve and the free end of each arm is brought to an edge 10 adapted to bear against the adjacent surface of spring 4 and to press outwardly thereagainst. From the end of each arm 8 and 9 are extended fingers 11 which straddle the adjacent portion of the spring and have their free ends bent toward each other as at 12 so as to loosely lap spring 4.

A loop 13 is mounted on the springs 4 and 7 and the intermediate end crown portions of these springs are arranged loosely in the loop. A chain or other flexible device indicated at 14 is connected to the loop and constitutes a means whereby the trap can be fastened to a stake, tree or other anchoring means.

When the jaws of the trap are closed together as shown in Figures 1 and 2 it is not possible to open them without first pressing the ends of spring 4 toward each other. Ordinarily this action is resisted by the supplemental spring 8 the edges of which tend to bite into the spring 4. In other words these edges act somewhat in the manner of pawls engaging ratchets. In order to open the jaws it is desirable to press the inturned portions 12 of fingers 11 towards the adjacent portions of spring 4 so as to disengage edges 10 from said spring. While the ends of supplemental spring 8 are thus being held, the spring 4 can be contracted more readily than would otherwise be possible.

Should a trapped animal attempt to pull the trap, the loop 13 would hold spring 8 under restraint, the crown portion of spring 4 moving toward the crown portion of spring 8 so that said spring 8 would exert an increased resistance to the contraction of spring 4.

The supplemental spring herein described can be applied readily to traps already in use by inserting it through the connection or loop 13, placing fingers 11 astride opposed portions of spring 4 and then bending the ends of the fingers toward each other to the positions shown.

What is claimed is:

The combination with a trap having pivoted jaws and a folded main spring for actuating the jaws, of a supplemental folded spring embraced by the main spring and having edges for engaging the adjacent surfaces of the main spring to resist contracting of said spring, means on one of the springs for holding the two springs assembled but slidably and loosely connected, and anchoring means through which both springs are extended for holding the supplemental spring to increasingly stiffen the main spring when the trap is pulled relative to the anchoring means.

In testimony that I claim the foregoing as my own, I have hereto affixed my signature.

JOHN J. HENRY.